June 2, 1936. L. W. SHUTTS 2,043,015
ANTISHIMMY AND ROAD SHOCK ABSORPTION
Filed June 23, 1934
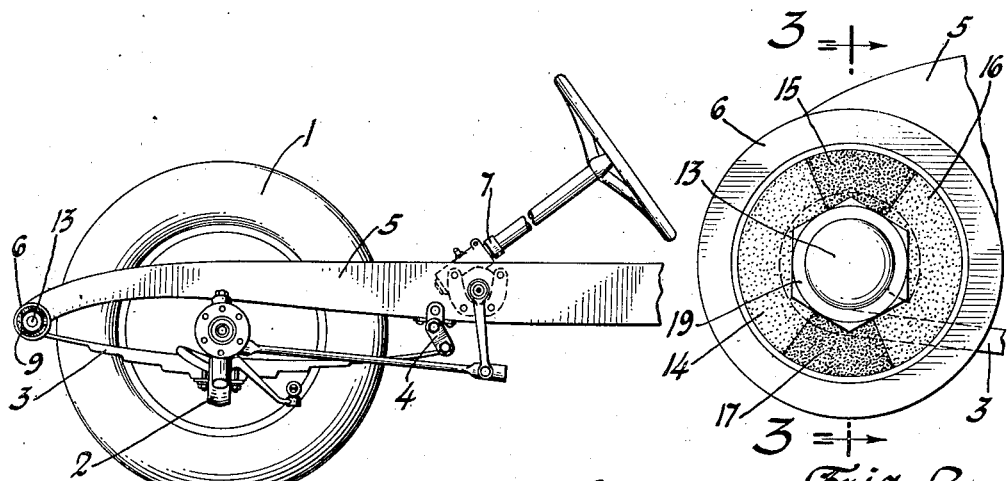
Fig. 1
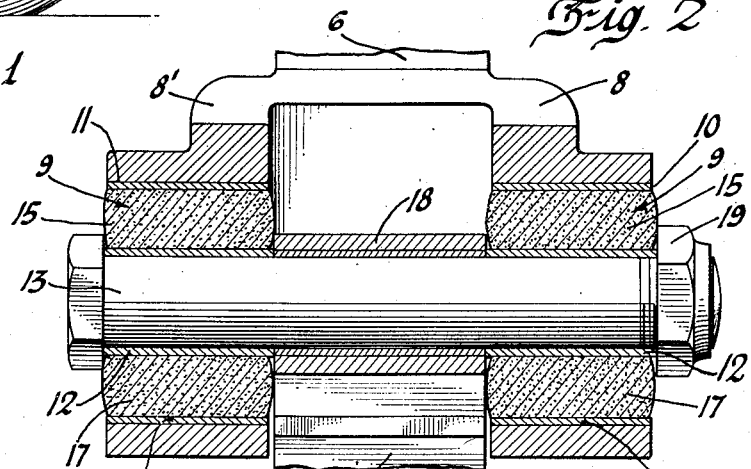
Fig. 2
Fig. 3
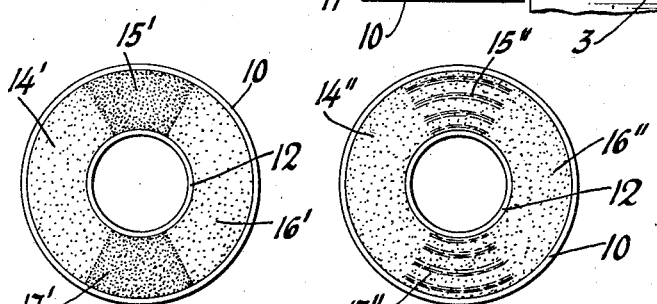
Fig. 4
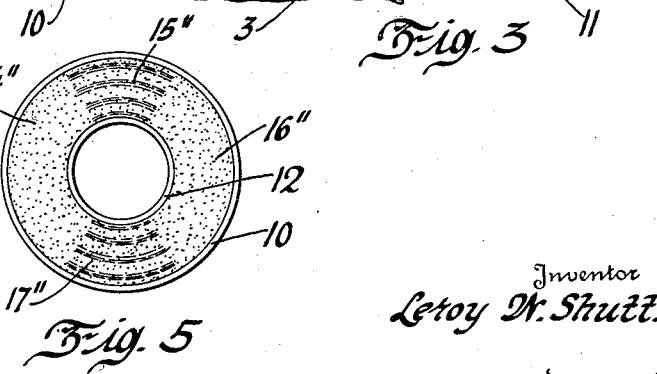
Fig. 5
Inventor
Leroy W. Shutts
By Blackmore, Spencer & Hint
Attorney Patented June 2, 1936

2,043,015

UNITED STATES PATENT OFFICE 2,043,015

ANTISHIMMY AND ROAD SHOCK ABSORPTION

Leroy W. Shutts, Detroit, Mich., assignor to General Motors Corporation, Detroit, Mich., a corporation of Delaware Application June 23, 1934, Serial No. 732,022

8 Claims. (Cl. 267—54)

This invention relates to improvements in resilient bushings, particularly relating to those used in motor car manufacture.

As is well known at certain speeds and/or on rough roads, the front wheels of an automotive vehicle, whose front wheels are connected to the frame by semi-elliptic leaf springs, tend to vibrate from one side to the other or what is commonly called "shimmy". Due also to the rough roads or bumps is the vertical bouncing or "tramp" of the front of the car and steering wheel kick caused by the front wheels striking an obstruction.

Shimmy, tramp and steering wheel kick can be eliminated by permitting horizontal movement of unshackled ends, whether front or rear, of semi-elliptic front springs but preventing any but normal vertical movement of these ends.

It is an object of this invention to provide a resilient bushing which will offer greater resistance in one direction than in another to relative movement of the members between which it is interposed.

More specifically the object of my invention is to provide a bushing for use in connecting the unshackled ends of the front springs to the chassis frame of automotive vehicles so that there will be considerably more resiliency in a horizontal plane than in a vertical plane in order to eliminate the various effects stated above.

With these and other objects in view, my invention consists in the construction as described in the specification, claimed in the claims and shown in the accompanying drawing, in which:

Figure 1 is a side elevation with one wheel removed of the front portion of a motor car equipped with semi-elliptic front springs whose front ends are connected to the chassis frame through bushings in which my invention is embodied.

Figure 2 is an enlarged view of the connection between the front end of one of the front springs and the chassis frame of the vehicle shown in Figure 1.

Figure 3 is a sectional view taken on line 3—3 of Figure 2.

Figure 4 is an end view of a modified form of bushing.

Figure 5 is an end view of a second modified form of bushing.

In the vehicle shown in Figure 1 there are provided front wheels 1 attached to an axle 2. Semi-elliptic leaf springs 3 are rigidly bolted to the axle 2. The rear ends of the springs 3 are fastened by shackles 4 to the frame 5 and the front ends thereof are connected to the frame 5 through rubber bushings 9. A conventional steering system is shown designated broadly at 7.

To the front ends of the side members of the frame 5 there are secured forked spring horns 6. Each of the legs 8 and 8' of these spring horns supports a separate and identical rubber bushing 9. Each bushing consists specifically of an outer metal shell 10 which is secured in a bore 11 in each one of the legs 8 and 8' and an inner metal shell 12. Between the two shells there are four sections, 14, 15, 16 and 17 of resilient material, such as rubber, which are held together at their edges by cement. Sections 15 and 17 are less resilient, i. e., more resistant to elastic deformation than sections 14 and 16, being made so either by making them of rubber of different consistency or by embedding strips of fabric therein. A bolt 13 goes through the center shells 12 of the pair of bushings 9 in each spring horn and also goes through the bushing 18 in the eye of the corresponding spring 3. The bolt is held fast by a nut 19 on the other end.

Figure 4 illustrates a bushing made of a single piece of rubber, the top and bottom portions or zones 15' and 17', of which are vulcanized or otherwise treated to make them more resistant to deformation than the two side parts 14' and 16'.

Figure 5 shows a bushing made of a single piece of rubber which has fabric embedded in the top and bottom portions 15" and 17" to render them more resistant to deformation than the portions 14" and 16". Figures 4 and 5 will give an illustration of the number of ways that the rubber element of my bushing may be formed.

Because of the difference in the resiliency of the sections 14 and 16 and the sections 15 and 17, the bushings 9 will oppose more resistance to vertical than to horizontal movement of the front ends of the springs 3, and will, therefore, permit the front ends of the springs to move sufficiently in a horizontal direction to eliminate shimmy, tramp and steering wheel kick without allowing them to move sufficiently in a vertical direction to produce instability.

I claim:

1. In combination with a vehicle frame, spring horn and a supporting spring therefor, a resilient bushing for connecting the spring and spring horn, said bushing composed of four sections of resilient material, the two sections in vertical alinement formed of material substantially harder to compress than the two sections in horizontal alinement, a metal tube surrounding the resilient sections, and fitting into a bore in the end of the horn, a small metal tube fitting in the center of the bushing, a metal bushing on the end of the spring, a shackle bolt passing through the small tube and the spring bushing to hold the two together.

2. In combination with a vehicle frame and a supporting spring therefor, a resilient bushing and a shackle bolt for connecting the two, said bushing composed of four sections, each opposite pair of which have different qualities of resilient material so that its resistance to deformation is greater along one transverse axis than the other.

3. An article of the class described comprising a small metal tube, four sections of resilient material radially surrounding said tube, the two opposite sections being formed of material substantially harder to compress than the other two opposite sections and a second metal tube surrounding the whole to secure it together.

4. An article of the class described comprising an elastic deformable bushing, two opposing zones on a transverse axis being made of a composition of a different degree of resiliency from those on the transverse axis at right angles thereto.

5. In combination with a vehicle frame and a supporting spring therefor, a resilient bushing, means for securing the three together, the bushing comprising a piece of resilient material, two opposing zones on a transverse axis being made of a composition of a different degree of resiliency from those on a transverse axis at right angles thereto.

6. A bushing comprising an inner and an outer shell, elastic means separating the two shells, radial portions of the elastic means being of a composition more resistant to deformation than other radial portions.

7. An article of the class described comprising in combination a supporting and a supported member, elastic deformable material between the two, portions of said elastic material extending from one member to the other being of a composition more resistant to deformation than the remaining portions.

8. An article of the class described comprising an inner tubular member, a plurality of radial sections of deformable elastic material surrounding the member, certain sections being formed of a composition more resistant to deformation than the others, and a second larger tubular member surrounding the whole to secure it together.

LEROY W. SHUTTS.